United States Patent Office 3,407,778
Patented Oct. 29, 1968

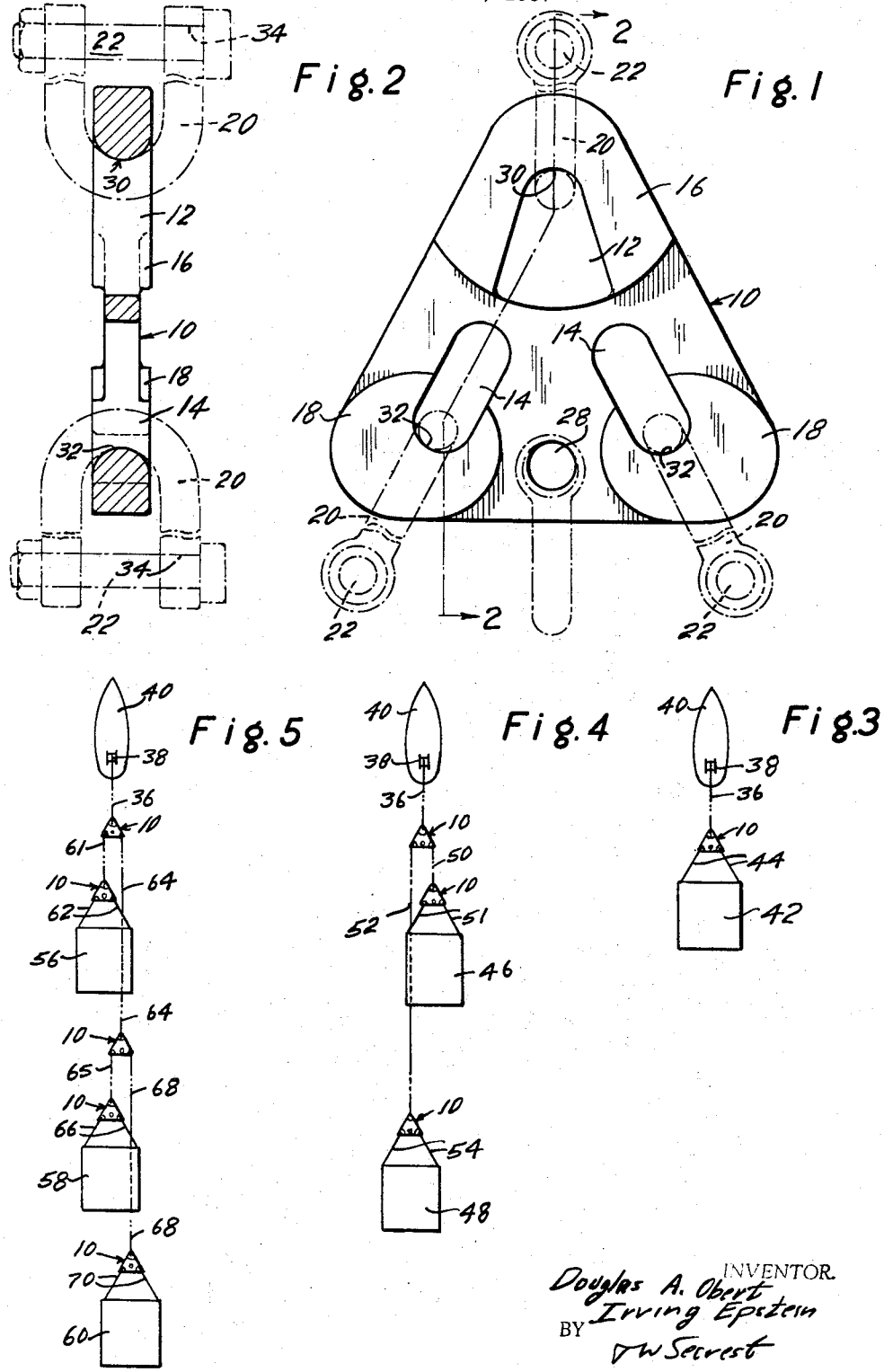

3,407,778
MARINE TOWING PLATE
Irving Epstein, Seattle, and Douglas A. Obert, Issaquah, Wash., assignors to Washington Chain & Supply Co., Inc., Seattle, Wash., a corporation of Washington
Filed Nov. 20, 1967, Ser. No. 684,118
6 Claims. (Cl. 114—235)

ABSTRACT OF THE DISCLOSURE

This invention relates to a marine towing plate characterized by having three elongated slotted openings therein and which openings are disposed in the pattern of a triangle, and preferably an isosceles triangle. The plate is disposed between portions comprising the towing line, forms a connection between said two portions thereof, and is located intermediate the towing and the towed vessels. The leading apex opening, in said triangular pattern, is reinforced at its forward end and adjacent side portions by a substantially U-shaped reinforcing web and each of the base openings, in said pattern, is reinforced at its trailing end adjacent the side portions by a substantially U-shaped reinforcing web. The size of each of the slotted openings is sufficient so that the shackle frame of a marine towing shackle may be threadedly received in such opening to detachably secure the shackle, so threaded, with the towing plate. Preferably, the external configuration of the towing plate mates with the triangular pattern of the openings in the plate, the towing plate is of uniform thickness between reinforcing webs, and the leading edge portion of the apex opening and the trailing edge portion of each base opening are arcuate and rounded for relative free movement of the frames of towing shackles and said openings and to reduce wear on said towing plate and on said shackles.

---

Our invention relates to a marine towing plate and more particularly to one disposed in the towing line and intermediate the towing line portion leaving the towing vessel and the towing line portion connected with the towed vessel.

In marine towing of vessels, there is always present problems, ever ominously threatening, because of the fury of the elements through weather and water conditions. Some towed vessels, as distressed vessels, decommissioned vessels, barges, and the like, and often of the size and tonnage of aircraft carriers, must be towed over oceans or over inland waters and where weather, wind and water may reach gale, hurricane, or typhoon proportions, as well as relatively calm weather, water and wind conditions.

Also, it is common to tow a plurality of vessels in tandem from a single towing vessel, as a tug, and on voyages upon ocean or outside water, as well as upon lakes, bays, or inside waters, or upon waters including both.

It is common practice to provide a tow line formed of wire rope at the leading or forward end portion thereof, which wire rope may be reeled onto or off a drum on the towing vessel and to provide such wire rope in combination with a second part of a towing line which comprises a towing chain secured aft or on the trailing end portion of the wire rope. The trailing end portion of such towing chain is connected with the forward end portion or prow of each of the vessels to be towed. Because of the weight of the chain, often the towing chain is of a size and length to weigh many tons, the chain sinks in the water and lies in an arcuate path with a mid portion of the chain deep in the water. Thus, as the distance between the towing and towed vessels changes, the chain may rise and fall in the water and the strain on the towing line and on the vessels involved is lessened by the action of the chain rising and falling in the water or is dissipated thereby. The length and size of the chain may be many hundreds of feet and the determination of the size of the chain and the length thereof used in any particular towing situation requires discretion on the part of the master of the towing vessel considering such factors as the depth of the water, the tonnage of the towed vessel, water and weather conditions, the power and thrust capability of the towing vessel, and other factors, such as changes which may be encountered during the tow.

In using such wire rope and chain combination in tandem towing, a great number of shackles were heretofore employed to make adequate connections. It is an object of our invention to provide a marine towing plate characterized by having only three suitable openings therein and requiring only one shackle for use in connection with each opening.

It is a further object to provide a marine towing plate having three slotted openings therein where the openings are arranged to form a triangular pattern, preferably isosceles, with a leading apex opening and two trailing openings, the latter forming the base of the triangular pattern.

It is a further object to provide reinforcing webs about such openings in the form of U-shaped webs and wherein the U-shaped web about the apex opening is disposed about the leading and contiguous wall portions forming the apex hole and wherein a U-shaped web is disposed about the trailing and contiguous wall portions of each of said base openings.

It is a further object to provide arcuate or rounded edge portions on the forward wall of the apex hole and on the trailing edge portions of each of the base holes.

It is a further object to provide a marine towing plate having an outside triangular configuration, mating the said triangular pattern of the openings, to provide a plate having minimum water resistance against towing.

It is a further object to provide a marine towing plate having slotted openings therein and which are elongated slots and of a size to threadedly receive the shackle frame of a towing shackle to the end that only one towing shackle need be employed for each of the holes or openings in the towing plate in securing towing lines to said towing plates.

Other objects of our invention, together with others inherent in the same, will become apparent or become implicit as the description of our invention proceeds in connection with the accompanying drawings throughout which like reference numerals indicate like parts:

FIGURE 1 is a plan view of a marine plate embodying our invention and with towing shackles shown in phantom;

FIG. 2 is a sectional view taken substantially on broken line 2—2 of FIG. 1;

FIG. 3 is a somewhat schematic view on a reduced scale showing a form of towing;

FIG. 4 is a view similar to FIG. 3 showing a form of tandem towing; and

FIG. 5 is a similar view showing another form of tandem towing.

A marine towing plate 10 is provided with an apex, elongated opening 12 and with two base, elongated openings 14, which openings are disposed in the pattern of a triangle, and preferably an isoceles triangle. A substantially U-shaped reinforcing web plate portion 16 extends around the leading and forward side edge portions of the apex opening 14. A substantially U-shaped reinforcing web plate portion 18 extends around the trailing and rear side edge portions of each of the base openings 14. Each of the elongated openings 12 and 14 is of a size to readily threadingly receive therein, a U-shaped shackle frame 20 of a towing shackle.

The towing shackles shown are of conventional construction and each has a threaded bolt 22 passing between the legs of its U-shaped frame 20. A nut 24 is threaded on the threads of bolt 22. One means for preventing the nut 24 from loosening on bolt 22 is shown by cotter pin 26. However, due to the tremendous forces that may be involved in marine towing on shackles, and the bolts and nuts thereof, often two nuts are used and they are jammed against each other and many times, for ocean or outside water towing, the nuts are also welded to the shackle frame means. Due to the "working" of the nuts relative to the bolts and the shackle frames during towing, extra precautions must be taken to prevent the nuts from becoming loose during a tow.

Another feature of the present invention, which demonstrates the magnitude of problems involved during marine towing under adverse circumstances, is that the towing plates of our invention are preferably made from chrome-nickel alloys (for strength and corrosion resistance) and have a break test strength in excess of 950,000 pounds. Typical plates of our invention have the following dimensions: a width of 22½" (parallel to a line between base openings 14); a height of 21½"; a thickness of plate (sectionally through webs 16 and 18) of 3"; and a plate thickness (between said webs) of 2".

An opening 28 is provided in plate 10 to which any suitable retrieving line (not shown) may be attached and used as desired for retrieving purposes.

In using the plate of our invention, the U-shaped shackle frame 20 may be readily turned or threaded into place through any of the elongated openings 12 or 14 and with an arcuate portion thereof resting against the arcuate or rounded portion 30 of the forward wall portion of the apex opening 12 or the arcuate or rounded trailing wall portion 32 of a base opening 14. Thereafter, the bolt 22 is extended into one of the holes 34 in the legs of shackle frame 20; an eye (not shown) terminating a towing line, as towing line 36, is positioned in place and the bolt is threaded through such eye; and then the bolt 22 is extended into the other hole 34 in the other leg of the shackle frame 20. Then the bolt 22 is secured to the shackle frame 20 by the nut 24 and the cotter pin 26, or the bolt 22 is secured in place by other means as previously described.

In the prior art where shackles, towing plates, and towing lines were used in combination, it required at least two shackles at each connection between a towing line end position and a towing plate. With our invention, and due to the construction of our marine towing plate, only one shackle is employed in each connection of a towing line end portion with a towing plate. This saves considerably in cost of material, labor, and results in less water friction in towing.

The towing line 36 is shown in FIGS. 3, 4, and 5 as having its leading end portion connected with a drum 38 of a towing vessel 40 and having its trailing portion connected with the apex opening 12 of the towing plate 10. The towing line 36 may be wire rope, a towing chain, or a combination thereof in accordance with conventional practice and as deemed best suitable by the master of the towing vessel 40. A towing plate 10, so connected, as shown in FIGS. 3, 4, and 5 may have its base openings 14 utilized in various ways.

In FIG. 3, a single towed vessel 42 is illustrated. Here, the base openings 14 of such a towing plate 10 are connected with the bridle lines 44 which in turn are connected with the forward end or prow of a towed vessel 42.

In FIG. 4, the tandem towing of two vessels 46 and 48 is illustrated. The showing as to the towing vessel 40, line 36, and plate 10 is the same as shown in FIG. 3. However, in FIG. 4, one of the base openings of said plate 10 is connected with a towing line 50, which in turn connects with the apex opening of a towing plate 10 and bridle lines 51 connect said towing plate 10 with the towed vessel 46. The other of said base openings 14 of said towing plate 10 is connected with a towing line 52, which in turn is connected with a towing plate 10 connected with bridle lines 54 which are in turn connected with the towed vessel 48.

In FIG. 5, a tandem towing of three vessels 56, 58, and 60 is illustrated. Again, the showing of the towing vessel 40, line 36, and plate 10 is the same as in FIG. 3. However, in FIG. 5, one of the base openings 14 of said plate 10 is connected with a towed vessel 56 through a towing line 61, a plate 10, and bridle line 62. The other base opening 14 of said plate 10 is connected with a towing line 64, in turn connected with a towing plate 10. One of the base openings 14 of such latter mentioned towing plate 10 is connected with a towed vessel 58 by a towing line 65, a towing plate 10, and bridle lines 66; and the other of said base openings 14 is connected with the towed vessel 60 through a towing line 68, a plate 10, and bridle lines 70.

In the event of tandem towing, typical instances of which are illustrated in FIGS. 4 and 5 of the drawing, towing lines 50 and 52 of FIG. 4, and towing lines 61, 64, 65, and 68 may be wire rope, chain, or a combination of wire rope and chain, all as indicated in connection with the towing line 36.

It will now be apparent that our invention provides a marine towing chain which may be used in the towing of a single vessel, as vessel 22 of FIG. 3, or the towing of a plurality of vessels, as 46 and 48 of FIG. 4, or a plurality of vessels 56, 58, and 60 of FIG. 5. Further, our invention provides a marine towing plate which can be readily connected to, or disconnected from, a towing line (wire rope, or chain, or a combination thereof), or connected to, or disconnected from, bridle chains and, in each instance, by the use of a single shackle 20-22-24-26, at each connection. This is to be distinguished from prior art practices where often three shackles were used for each connection. Also, our invention is to be distinguished from prior art practices of chain linkage which required torch burning for disconnection. Such burning was not only time consuming and required the presence and use of torches and other equipment, but such burning reduced the strength of adjacent retained chain linkage by approximately 40%.

Further features of our invention which will now be apparent are a marine towing plate 10 having three elongated slotted openings comprising an apex opening 12 and two base openings 14. The said openings are arranged in a triangular pattern, preferably an isosceles triangle, and with the apex opening 12 adapted to be connected by a shackle 20-22-24-26 with the trailing end of the towing line portion 36, which towing line portion has its leading end portion connected with the towing vessel 40. Next, the base openings 14 are adapted to be connected, through a single shackle 20-22-24-26, with the leading end of towing line portions as, bridle lines 44 (FIG. 3); towing line portions 50 and 52 and bridle lines 51 and 54 (FIG. 4); and towing lines 61, 64, 65, and 68 and bridle lines 62, 66, and 70 (FIG. 5).

Next, each of the openings 12, 14 is an elongated slotted opening so that the U-shaped shackle frame 20 may be readily threaded through such an opening and will abut against the forward wall portion forming the apex opening 12 and abut against the rear wall portion forming a base opening 14. A substantially U-shaped reinforcing web 16 extends around the leading and side portions of the apex opening 12. A substantially U-shaped reinforcing web 18 extends around the trailing and rear side portions of each of the base holes 14. Marine towing plates of our invention may be made having tremendous strength, such as a break test strength in excess of 950,000 pounds.

In certain instances it may be desirable to have the reinforcing webs 16 and 18 of a softer and more ductile material than the main body of the towing plate 10, and even the shackles, so that the shackles wear the webs to seat themselves with respect to the webs and towing plate.

We claim:

1. A marine towing plate having three elongated slotted openings therein disposed in a triangular pattern with the plate portion carrying an apex opening of said pattern being adapted to be connected, through a towing shackle, with the trailing end portion of a towing line which has its leading end portion connected with a towing vessel and with the base openings of said pattern, opposed to said apex opening, each being adapted to be connected, through a towing shackle, with the leading end portion of a towing line having its trailing end portion connected with a towed vessel comprising a substantially U-shaped reinforcing web plate portion extending around the leading and forward side edge portions of the elongated slotted apex opening; and a substantially U-shaped reinforcing web plate portion extending around the trailing and rear side portions of the elongated slotted base openings, each of said three slotted openings being of a size to threadingly receive the shackle frame of a towing shackle.

2. The combination of claim 1 wherein the external configuration of said towing plate mates the triangular pattern of said slotted openings.

3. The combination of claim 1 wherein the said triangular pattern is an isosceles triangle and the apex opening thereof is the apex opening connected with the trailing end portion of the towing line connected with the towing vessel.

4. The combination of claim 1 wherein the portions of said plate member between said webs is of a substantially uniform thickness and lesser than the thickness of said webs.

5. The combination of claim 1 wherein the wall forming the leading edge of the apex openings and the walls forming the trailing edges of the base opening are arcuate and rounded in section.

6. A combination of a marine towing plate and a shackle, said combination comprising, said marine towing plate having three elongated slotted openings therein disposed in a triangular pattern with the plate portion carrying an apex opening of said pattern being adapted to be connected, through a towing shackle, with the trailing end portion of a towing line which has its leading end portion connected with a towing vessel and with the base openings of said pattern, opposed to said apex opening, each being adapted to be connected, through a towing shackle, with the leading end portion of a towing line having its trailing end portion connected with a towed vessel comprising a substantially U-shaped reinforcing web plate portion extending around the leading and forward side edge portions of the elongated slotted apex opening; and a substantially U-shaped reinforcing web plate portion extending around the trailing and rear side portions of the elongated slotted base openings, said shackle comprising a shackle frame having two legs, said legs being capable of positioning a shaft between them, each of said three slotted openings being of a size to threadingly receive the shackle frame of a towing shackle, and a shackle in said slotted opening with said shackle frame in the opening and with the legs extending outside the frame and terminating outside the frame.

References Cited

UNITED STATES PATENTS 2,318,150   5/1943   Foss.
3,153,829   10/1964  Luketa.

MILTON BUCHLER, *Primary Examiner.*

T. M. BLIX, *Assistant Examiner.*